United States Patent [19]
Ponce

[11] 3,967,788
[45] July 6, 1976

[54] ENDLESS LOOP CASSETTE

[76] Inventor: Fred C. Ponce, 217 Avenue C, Redondo Beach, Calif. 90277

[22] Filed: Mar. 27, 1975

[21] Appl. No.: 562,620

Related U.S. Application Data

[60] Division of Ser. No. 461,062, April 15, 1974, which is a continuation-in-part of Ser. No. 191,460, Oct. 21, 1971, abandoned.

[52] U.S. Cl. ............................ 242/55.19 A; 242/76
[51] Int. Cl.² ........................................ G11B 23/04
[58] Field of Search ......... 242/76, 55.19 A, 55.19 R

[56] References Cited
UNITED STATES PATENTS 3,088,687   5/1963   Martin ..................... 242/55.19 A
3,227,508   1/1966   Bavaro ..................... 242/55.19 A

*Primary Examiner*—Robert I. Smith
*Attorney, Agent, or Firm*—Nilsson, Robbins, Dalgarn & Berliner

[57] ABSTRACT

Improved endless loop film cassettes which allow film to be unwound and rewound about a common reel by removal of the innermost convolution of film from the center of the film pack without scrubbing and returning the same to the outermost convolution of the film pack. Two embodiments are disclosed, both capable of operation at any angle between horizontal and vertical.

12 Claims, 13 Drawing Figures

FIG.9.
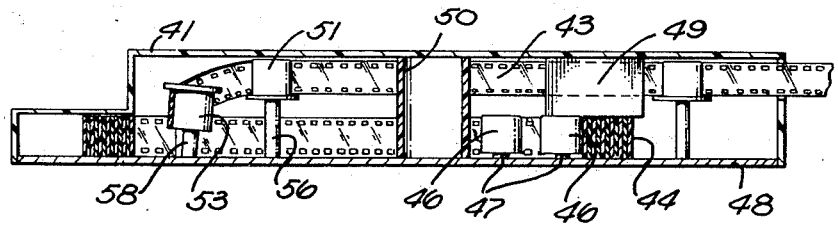
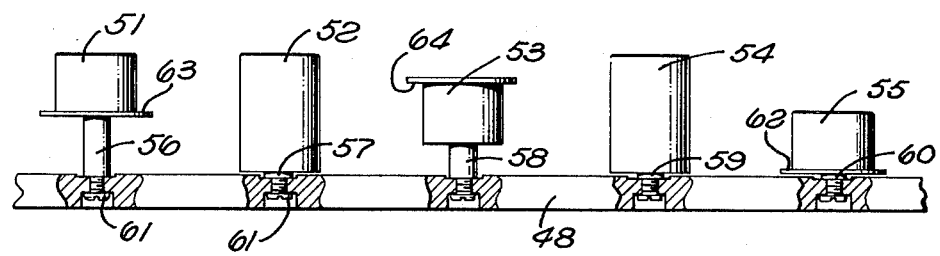
FIG.10.
FIG.11.
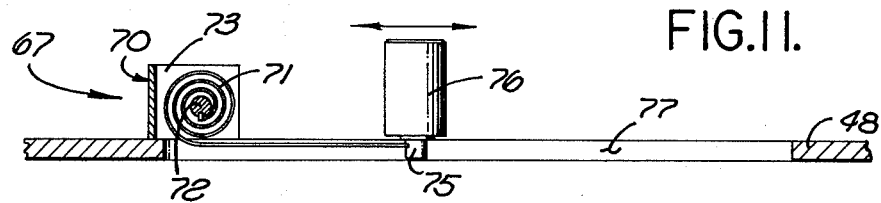
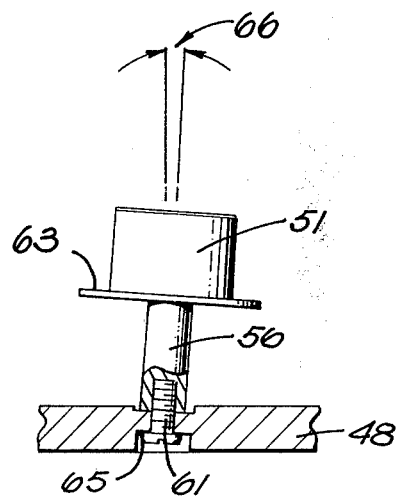
FIG.12.
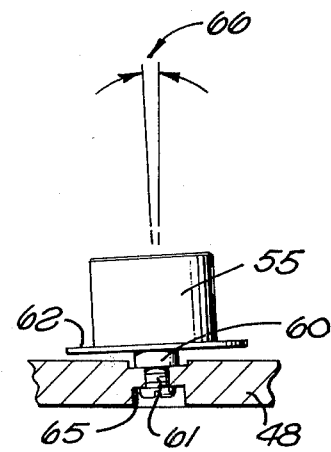
FIG.13.

ENDLESS LOOP CASSETTE

CROSS REFERENCES TO RELATED APPLICATIONS

This is a division, of application Ser. No. 461,062, filed Apr. 15, 1974 which in turn, is a continuation-in-part of Ser. No. 191,460, filed Oct. 21, 1971, now abandoned.

BACKGROUND OF THE INVENTION

A major cost of motion picture presentations is the labor necessary for film handling and services. All movie theaters currently require at least one projectionist whose sole responsibility is to handle the film being presented. His primary functions are to change film reels in order to present a double feature and to rewind the presented film in order to be able to re-present it to the audience.

In order to become competitive for the entertainment dollar and to encourage motion picture viewers to leave their television sets and view a movie at a theater, theater owners have tried to economize and reduce the cost of attending a theater. It quickly became apparent that one of the few areas where costs could be cut was labor and automation was the key. Based upon this information, a new type of theater evolved; namely, the mini-theater. A mini-theater in theory could be operated by a single manager who would sell and collect the tickets while refreshments were purchased from vending machines. The only problem was that the manager, while handling all his other duties, could not be in the projection room handling the film; therefore, a projectionist was still necessary. The need for a second individual just for the purpose of film handling partially negates the major advantage of the mini-theater. Other cost cutting developments, such as housing a plurality of theaters all in one building, wherein one person could sell and collect tickets for all the theaters, also reduces costs, but a projectionist is still required for each theater.

Many attempts have been made to provide a motion picture projection system which is fully or semi-automatic and eliminates the need for a projectionist. Most of these attempts involve the use of film systems wherein two reels are mounted vertically on each side of a projector and the film is unwound from one reel, twisted 90°, projected, twisted 90° again and wound around the other reel. A system similar to this is used quite extensively on aircraft. The aforementioned system and all known systems of endless loop projection have a number of inherent problems. One problem which is peculiarly troublesome in an aircraft is the inability of the system to operate in any plane other than vertical. Therefore, at least 3 feet of height is required between the cabin ceiling and the outer fuselage, to accommodate a full length motion picture reel. Additionally, the extra reel and associated mechanism entails a serious weight penalty which is a major aircraft problem. Another problem, which is common to all current endless loop film systems is one that is inherent in the basic principle of unwinding the innermost convolution of film and then rewinding it as the outermost convolution.

When the innermost convolution of film is pulled from the center of the film pack the length of film being unwound rubs against the next outer convolution of film under high friction which causes a scrubbing action between the two lengths of film. This scrubbing action scratches the surface of the film, seriously destroying its projection qualities and causes excessive wear, which leads to breakage. These problems have served as a deterrant to the expansion of endless loop film system utilization and have seriously impeded the cost effectiveness of endless loop film use in mini-theaters, maxi-theaters and aircraft.

Prior art references cited in the parent application Ser. No. 191,460 are U.S. Pat. Nos. 3,064,914 to Windhorst, 1,825,142 to Bruno, 2,830,812 to Nash et al, Canadian Patent 608,977 to Fleming et al and German Patent 505,659 to Pathe.

SUMMARY OF THE INVENTION

The present invention solves all of the aforementioned problems by providing endless loop film cassettes which are operable at any angle between horizontal and vertical and which allow film to be removed from its center without scrubbing, all of which is accomplished with single reel construction.

Two embodiments are presented, both of which utilize an endless loop film cassette consisting of a single reel containing a spirally wound film pack. The cassette comprises an integral unit capable of being utilized at any angle from horizontal to vertical without additional accessories. A plurality of film pack rollers defines a primary path for the film pack. Other rollers are arranged so that at a predetermined point the innermost convolution only is caused to traverse a secondary path along a plane other than the plane of the film pack which continues to rotate along the primary path. The innermost convolution of film enters the secondary path without scrubbing against the next convolution of film on the film pack and then traverses from its secondary path back to the primary path of the film pack to become the outermost convolution of film on the film pack.

In a first embodiment, as illustrated in FIGS. 1–6 hereafter, at the aforementioned predetermined point all convolutions of film forming the film pack are separated from the innermost convolution, by engagement of the film path mechanism with the innermost convolution and motor-driven movement of the mechanism itself from the primary plane of rotation of the film pack to a secondary plane parallel thereto and then back to the primary plane. In this first embodiment, the film path mechanism includes an approximately circular array of a plurality of film rollers and the first mentioned film pack rollers are in an approximately semicircular array of greater radius than the circular array and approximately spirally concentric therewith.

The second embodiment, as illustrated in FIGS. 6–13 hereafter, is simpler in construction than the first embodiment and does not require a separate motor nor movement of a mechanism other than simple rotation of film rollers and film pack rollers. In the second embodiment, the film pack path (primary path) is also defined by a plurality of film pack rollers, but of substantially circular array. An inner, approximately semicircular array of film rollers, of smaller radius than and approximately spirally concentric with, the circular array of film pack rollers, defines a secondary path for the inner convolution of film. Instead of moving to a secondary plane, the film rollers in the secondary path include members having extended length or which are disposed progressively higher than the primary plane so as to guide the film to the secondary plane. Additionally, the film rollers in the secondary path are either canted to a predetermined inclination, or flexibly mounted to permit such inclination, so as to enable spiraling of the film in its movement to the secondary plane.

Both embodiments utilize to advantage the natural spiral angle of motion picture film. In this regard, motion picture film has certain characteristics which prevent the utilization of usual methods of cross-reeling as practiced, for example, in the fiber art. The film is planar, that is, the width dimension is substantially larger, by at least a factor of 10, than the thickness dimension and its length dimension is at least 100 times its width dimension. The film has sufficient longitudinal flexibility (i.e., along the plane of the thickness dimension) so that it may be readily wound on reels, yet it has a degree of stiffness so that it cannot be folded flat without cracking of the gelatin or other such surface. Further, as a result of its planar form, the film cannot be simply bent along the plane of its width dimension without crimping or other damage. However, both of the present embodiments gradually lift the film along its width plane while moving it along its thickness plane so as to carry the film outwardly from the film pack in a spiral path, as above described.

BRIEF DESCRIPTION OF THE DRAWINGS

FIG. 9 is a view along lines 9—9 of FIG. 7;

FIG. 10 is a view along lines 10—10 of FIG. 8;

FIG. 11 is a view of a tension roller mechanism of the second embodiment along lines 11—11 of FIG. 10;

FIG. 12 is a view along lines 12—12 of FIG. 8; and

FIG. 13 is a view along lines 13—13 of FIG. 8.

DETAILED DESCRIPTION

Figure 1:
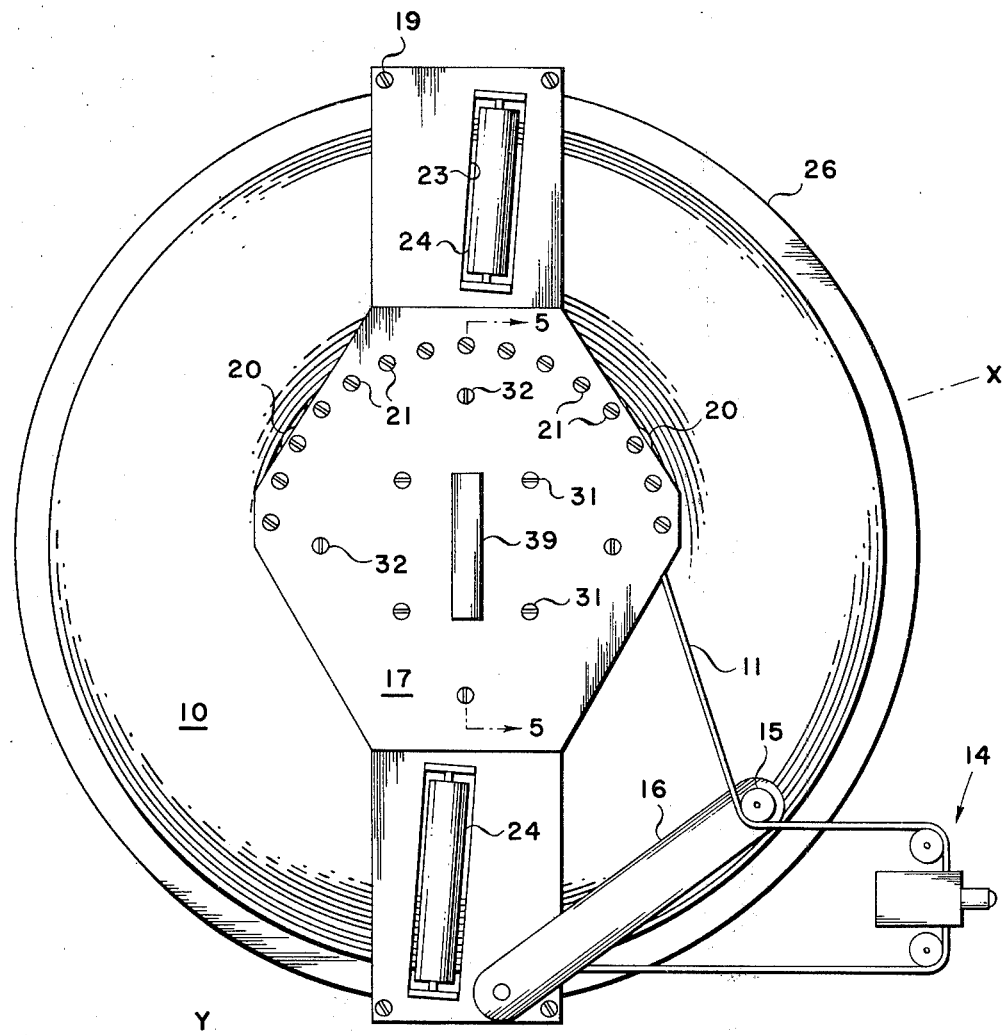
FIG. 1 is a plan view of an endless loop film cassette of a first embodiment in conjunction with a schematic projection system.

The two embodiments, illustrated in the drawings and to be described hereinafter in detail, contain certain common aspects. In both embodiments a plurality of film pack rollers are disposed in at least an arc of a circle along a primary path supporting at least a portion of the circumference of the film pack. A plurality of film path rollers are adapted to guide the innermost convolution of film from the film pack along a secondary path, the film path rollers being disposed to approximate at least an arc of a circle and having a radius less than the radius of the film pack rollers. Furthermore, in both embodiments the film path rollers are in spiral relation with the film pack rollers, that is they define a path spiraling away from the plane of the film pack. In the embodiment illustrated in FIGS. 1–6, the spiral relation is defined by rotation of a film path mechanism. In the embodiment illustrated in FIGS. 7–13, the spiral relation is defined by the rigid disposition and spacing of the film path rollers. In both cases, in order to accomplish withdrawal of the film, the plane of the film path rollers, when in said spiral relation, is offset from the plane of the film path rollers by an angle between about 1° and about 10°. For 16 mm film, an ideal angle in 3°30'.

In order to obtain a better understanding of the present invention it should be understood that in describing this invention "inwardly" shall be taken to mean inwardly towards the axis of the film pack and the "innermost convolution" is that convolution closest to the axis and "outwardly" shall be taken to mean outwardly away from the axis of the film pack, and the "outermost convolution" is that convolution furthest from the axis. Additionally, "primary path" shall be taken to mean the path traveled by the film pack including its outermost convolution and "secondary path" shall be taken to mean the path traveled by the innermost convolution of the film pack upon leaving the primary path of the film pack until it returns to the film pack as its outermost convolution, at which time it travels along the primary path again. While the embodiments of this invention have been and will continue to be described as a motion picture film system, it will be obvious to anyone that the basic concept and mechanisms for accomplishing it can be adapted and utilized for any endless loop system, whether it be film, tape, cloth or ribbon, or any other film having a planar configuration with width, thickness and length dimensions as above given, and whether it is for projection, recording, transmitting or any other kind of endless loop movement.

FIRST EMBODIMENT

Figure 2:
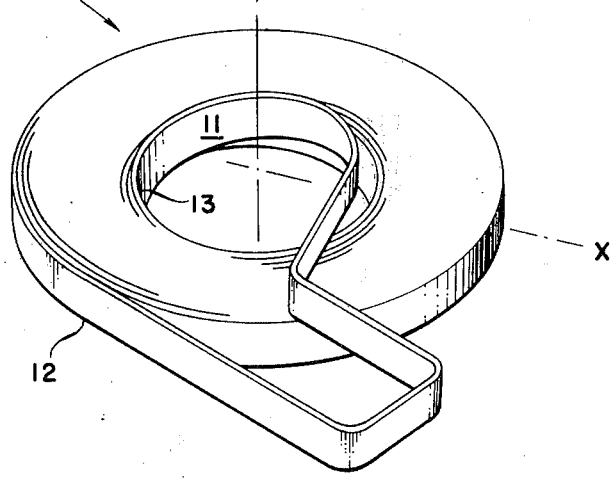
FIG. 2 is a perspective view of a film pack of the first embodiment illustrating the secondary path of the innermost convolution of film.

Referring now to the drawings, wherein like reference numbers designate like or corresponding parts throughout the several views, there is shown in FIG. 2, a film pack 10, consisting of an endless loop film which is spirally wound to form a plurality of convolutions. As mentioned hereinbefore, the film pack 10 consists of a plurality of spirally wound convolutions of an endless tape and has an innermost convolution 11 and an outermost convolution 12. The innermost convolution 11 commences to leave the film pack 10 and its primary path at point 13 and commences its secondary path during which it traverses the film pack 10 and returns to the primary path as the outermost convolution 12 of the film pack 10. During its travel along its secondary path, the convolution 11 passes through a projection system 14, which is disposed along the secondary path and upon leaving the projection system the convolution begins its return to the primary path. The projection system 14 is shown in schematic in FIG. 1 and will not be described in detail since it is old in the art and not of importance to this invention. Prior to entering the projection system the film 11 passes through a series of differential take-up rollers 15 (only one of which is shown for simplicity). The illustrated take-up roller 14 is rotatably secured to one end of a spring biased member 16, the opposite end of which is pivotally secured to a cover plate 17 which traverses the film pack 10 and serves as a support means for portions of a film path mechanism 18, hereinafter described. The cover plate 17 is secured in a fixed position by a plurality of screws 19.

Because of the differential velocity between the inner and outer diameters of the film pack 10, provisions may be necessary in addition to the differential take-up roller 15, in order to accommodate the temporary storage of film. If it is determined to be desirable or necessary to further compensate for the differential velocities of the innermost convolution 11 and the outermost convolution 12, a dancer arm and slack box arrangement may be utilized to provide the desired tension and synchronization between the velocity of the innermost convolution of film upon entering and exiting from the projector 14. A slack box has not been illustrated since it is old and well known in the art to which this invention pertains and additionally, because it is not considered as part of the present invention nor necessary for its operation.

Disposed within the portion of the cover plate 17, which lies in juxtaposition to the film pack 10, are a pair of cut-outs 23 which extend substantially radially to the film pack 10. A cylindrical roller 24 is rotatably secured within each cut-out 23 and adapted to hold the convolutions of the film pack in the primary path in order that the entire cassette may be tilted at any angle without having the convolutions prematurely unwind.

Figure 3:
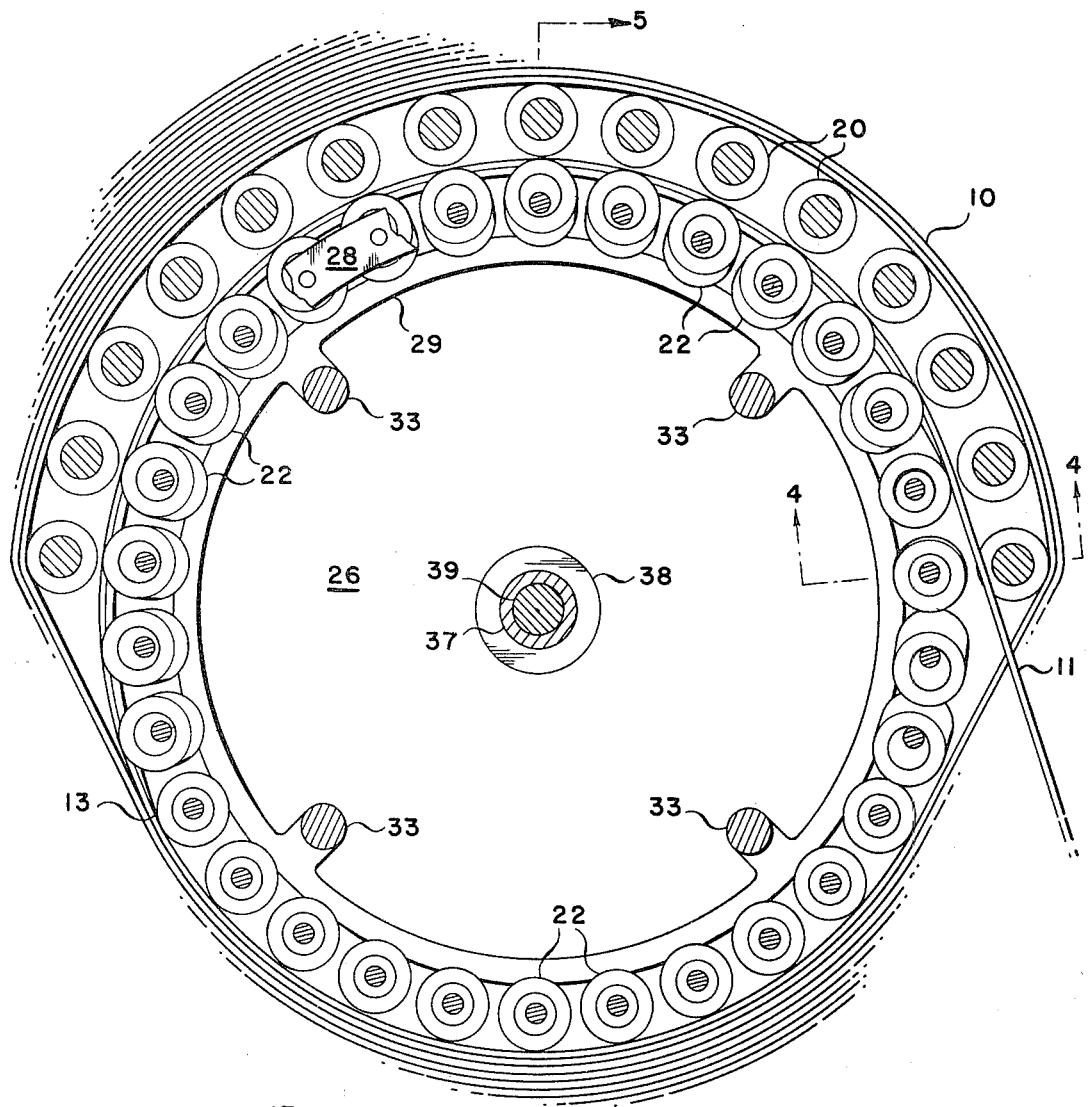
FIG. 3 is a cut-away plan view of the first embodiment of the cassette showing the path of the innermost convolution of film and the film pack with relation to the film path mechanism.

Referring now to FIG. 3, there is shown a plurality of film pack rollers 20 which form a semicircular progression. The rollers 20 are rotatably secured by a plurality of fasteners 21 which are attached to the cover plate 17 and serve to position the rollers 20 along the plane of the primary path in order that a portion of the inner circumference of the film pack 10 can ride upon the outer circumference of the rollers 20.

Figure 4:
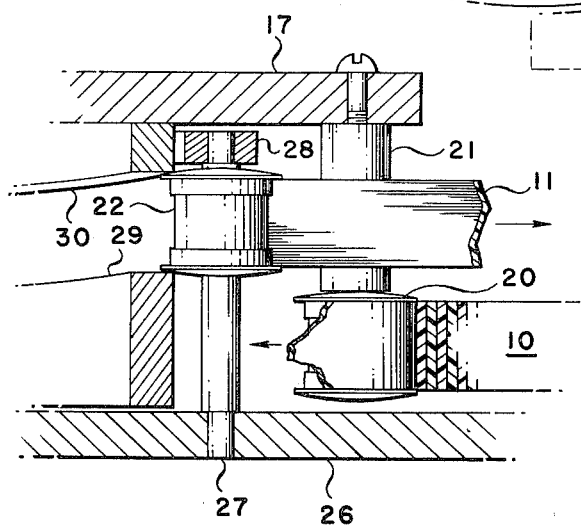
FIG. 4 is a view along lines 4—4 of FIG. 3.
Figures 5, 6:
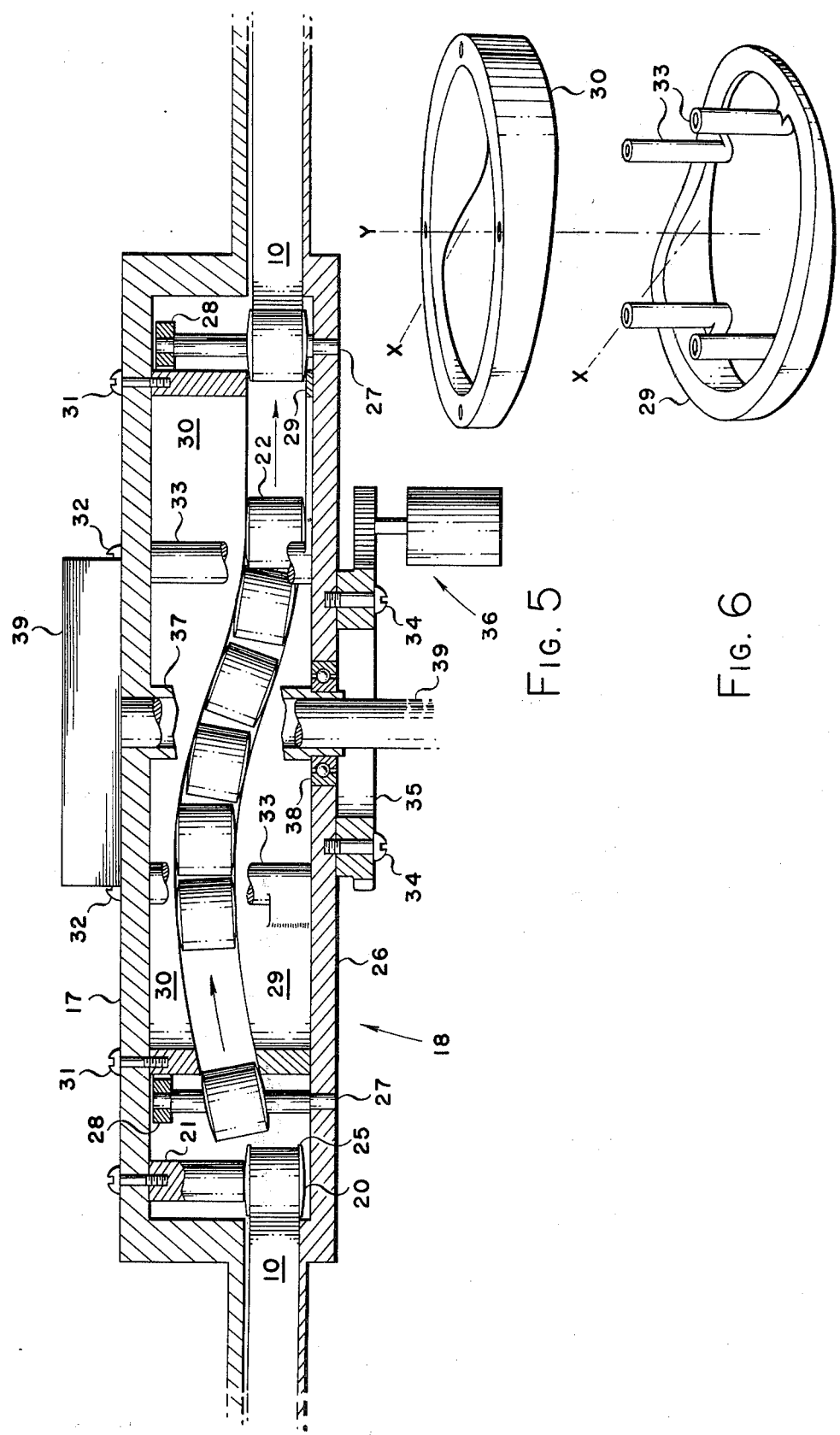
FIG. 5 is a view along lines 5—5 of FIG. 3, showing the film path mechanism.
FIG. 6 is a perspective view of the upper and lower cams utilized in the first embodiment.

The rollers 20 have a circumferential lip 25 along their edges as best illustrated in FIGS. 4 and 5. The lips 25 serve the purposes of retaining and guiding the film pack 10 through its primary path while preventing the film pack from coming into contact with a rotating back plate 26. By securing the rollers 20 to the cover plate 17, it is possible to position the rollers 20 in juxtaposition to, but not in contact with, the back plate 26.

It will be noted that the internal diameter of the film pack 10 does not have a constant diameter since the internal radius increases along that portion supported by the film pack rollers 20 and decreases where not supported thereby. The internal radius of the film pack 10 is caused to increase by the film pack rollers 20 which form a semicircle having a radius greater than the film pack's normal internal diameter. Disposed inwardly of the film pack rollers 20 is the film path mechanism 18, which consists primarily of a plurality of film path rollers 22. The film path rollers 22 are rotatably, pivotally and slidably secured to a plurality of shafts 27 which are secured on one end to the rotating back plate 26 and adapted to rotate therewith. The free end of the shafts 27 are interconnected by a ring 28 which serves to further support the shafts 27 and retain them in alignment relative to each other. The ring 28, which can be press fitted on the free end of the shafts 27, also prevents the rollers 22 from sliding off the end of the shafts 27. It will be noted by referring to FIG. 5, that the shafts 27 and the ring 28 terminate in juxtaposition to but not in contact with the fixed cover plate 17. The rollers 22 consist primarily of an inner cage having an internal diameter slightly greater than that of the shaft it slides upon and an outer cage which is pivotally mounted about the inner cage, whereby the outer cage is capable of angular movement relative to the axis of the shaft 27 without causing binding of the inner cage on the shaft 27. The inner cage and the outer cage of the roller 22 are both capable of rotating about the shaft 27 relative to its axis.

Positioned inwardly of the shaft 27 in contact with a portion of the lower side of the roller 22 is an annular lower first cam 29 and in complementary parallel relationship thereto in contact with a portion of the upper side of the roller 22 is an annular upper second cam 30. Both of the cams 29 and 30 are fixedly secured to the cover plate 17 by a plurality of fasteners 31 and 32 respectively. Referring now to FIG. 6 it will be noted that both the first cam 29 and the second cam 30 are annular in configuration and the first cam has a plurality of supports 33 which extend upwardly and inwardly thereof and are secured to the lower surface of the cover plate 17 by the fasteners 31. The second cam 30 is secured directly to the lower surface of the cover plate by the fasteners 32. As mentioned hereinbefore, the first and second cams are complementary and each abut an opposite side of the inward portion of the outer cage of the roller 22. The configuration of the portion of the cams 29 and 30 in contact with the rollers 22 are predetermined in order that the rollers 22 are caused to slide up and down on the shaft 27 and to pivot during their transitional movements. The purpose of the simultaneous sliding and pivoting motion of the rollers 22 will be described hereinafter; suffice it for the time that the inner portion of both sides of all of the rollers 22 are in constant contact with the cams 29 and 30 and the rollers and caused to move from the primary path to the secondary path and back again as predetermined by the configuration of the cams 29 and 30.

Secured to the backside of the back plate 26 by a plurality of fasteners 34 is a ring gear 35 which is adapted to be rotatably driven by a drive gear and motor arrangement 36. It will be noted by reference to FIG. 5, that the cover plate 17 has a radially extending sleeve 37 which is journaled to the back plate 26 by a roller bearing 38, which is press fitted between the sleeve 37 and the internal diameter of the back plate. A tee handle 39 is disposed through the sleeve 37, the back plate 26 and the ring gear 35 to releasably engage a support structure (not shown). The head of the tee handle 39 lies in abutment to the outer face of the cover plate 17 and acts in conjunction with the sleeve 37 and the cover plate screws 19 to hold the cover plate 17 in fixed spaced relationship to the rotating back plate 26.

Before explaining the operation of the endless loop film cassette it will probably assist in the complete understanding thereof to reiterate which members are secured to the cover plate 17 and are therefore fixed in place to rotate therewith. Affixed to the cover plate 17 are the film pack rollers 20, the second cam 30 and the first cam 29. Affixed to the back plate 26, and therefore adapted to rotate therewith relative to those members affixed to the cover plate, are the film path rollers 22 and their associated supporting structure.

In operation, the endless loop film cassette is secured to a projector 14 and the innermost convolution 11 is threaded around the differential take-up roller 15 into the projecting mechanism and then back to the film pack 10 as its outermost convolution 12. A substantial portion of the inner circumference of the film pack 10 is supported by and on the film pack rollers 20 between the circumferential lips 25. The rollers 20 are held in position by the fasteners 21 while still being able to rotate about their axis. After the innermost convolution 11 is threaded through the projector 14, the projector is actuated, which simultaneously actuates the motor and drive gear arrangement 36. The motor and drive gear arrangement 36 drives the back plate 26 at a speed complementary to the speed of the projection system so that the rotational movement of the back plate and the projector are in synchronization. The engagement of the film with the projector causes the entire film pack 10 to rotate about the rollers 20 and on the rollers 22, which are rotating in synchronization as shown in FIG. 3. In order to remove the convolution 11 from the film pack 10, project it and then return it to the film pack without scrubbing and with a minimum of frictional resistance the rollers 22 are programmed by the cams 29 and 30 to direct the convolution 11 through its predetermined path. As mentioned hereinbefore, the cams 29 and 30 contact each side of the rollers 22 and since the rollers are capable of lateral, rotational and pivotal movement they follow the path that is determined by the cams. At or about point 13 the convolution 11 starts to leave the film pack 10. It will also be noticed that the inner diameter of the film pack starts to increase at approximately the same point due to the rollers 20 which are disposed along a radius greater than that of rollers 22. As the convolution 11 is leaving the film pack the cams 29 and 30 cause the rollers 22, which are rotating in synchronization with the film, to pivot and move laterally along the roller shaft 27 from the primary path to the secondary path. The convolution 11 is engaged by the rollers 22 prior to point 13 and remains in engagement as the rollers pass completely through their transition until the rollers return to the primary path. The cams 29 and 30 are configured to take the rollers 22 through a path which causes the innermost convolution 11 to travel from the primary path to the secondary path. When the film is completely within the secondary path and completely free of the film pack the rollers 22 return to the primary path in engagement with the next innermost convolution and the innermost convolution now positioned in the secondary path is caused to pass through the projector which is also disposed in the secondary path. After leaving the projector the film rejoins the film pack in its primary path as its outermost convolution. Since the rollers 22 are secured to the back plate 26 the rollers rotate at the same speed as the film pack and the projector. Therefore, there is a minimum amount of friction between the film and the rollers.

While it is preferred to rotate the rollers 22 as a unit between the cams 29 and 30 in order that the rollers 22 can fully accommodate the transitional path of the innermost convolution 11, it is within the contemplation of this invention that the rollers 22 be fixed in that they are capable of rotating about their own axis but not rotate as a unit. If the rollers 22 are fixed, then the cams 29 and 30 can be replaced by a single cam or alternatively by a stop on the shafts 27, which support the rollers 22.

In such an embodiment with the rollers 22 fixed in the desired orientation to accommodate the transitional path of the innermost convolution 11, the wear on the film will be greater than would be the case if they were rotating; however, in certain applications, the weight reduction and decreased maintenance may justify the increase in friction.

SECOND EMBODIMENT

Figure 7:
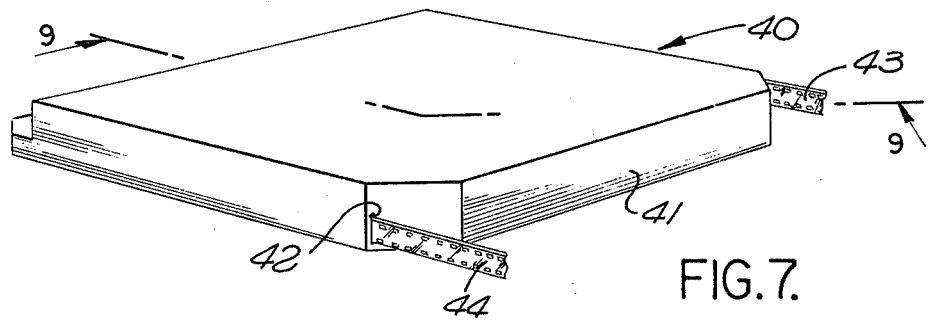
FIG. 7 is a perspective view of an endless loop film cassette of a second embodiment.

Referring now to FIG. 7, there is shown a cassette 40 of simplified construction and operation. The cassette 40 has a cover plate 41 with slits such as 42, in the front end, through which an innermost film convolution 43 leaves along a secondary path and returns as an outermost convolution 44 along a primary path. The film portions 43 and 44 are, of course, connected together as an endless loop which, as in the first embodiment, passes through a projection system, not shown.

Referring to FIGS. 3–10, there is shown a film pack 45 supported on a plurality of film pack rollers 46 which are disposed to approximate a circle. The film pack rollers 46 are rotatably secured by a plurality of posts 47, shown in FIG. 9 which are rigidly attached to a support or back plate 48 and serve to position the film pack rollers 46 along the plane of the primary path in order that the inner circumference of the film pack 45 can ride upon the outer circumference of the rollers 46. More rollers than shown can be used if desired but exact circularity is not needed and the number of rollers 46 shown, or even a few less, are satisfactory to define the primary path of the film pack. The back plate 48 is coated with a low friction material such as Teflon (a commercial fluorocarbon polymer).

As shown in FIG. 9, the film pack rollers 46 are straight-line, i.e., cylindrically formed with no circumferential lip. Retaining spacers 49 (also seen in shadow in FIG. 8), in the form of simple parallelepipeds, are secured by adhesive to the bottom surface of the cover 41 in quadrature array over the film pack. The bottom surfaces of the spacers 49 are disposed in close proximity to the top edge of the film pack 45 and serve to retain the film pack 45 in the primary path. A central cylindrical boss 50 spaces the cover 41 from the base 48.

Disposed inwardly of the film pack rollers 46 are a number of film path rollers 51, 52, 53, 54 and 55, shown in extended array and in more detail in FIG. 10. In FIG. 9, film path roller 52 is not shown so as to more clearly illustrate the film path. Each of the rollers 51–55 is supported on a post 56, 57, 58, 59 and 60, respectively, which, although shown as perpendicular, are actually canted as shown in FIGS. 12 and 13 and which will be discussed more fully hereinafter. The posts 56–60 are secured to the back plate 48 by means of countersunk screws 61.

The film path rollers 51–55 are disposed to approximate the arc of a circle, substantial a semicircle, having a smaller radius than the "circle" defined by the film pack rollers 46 and with the same central axis. Alternate film path rollers 55, 53 and 51 are spaced progressively further from the back plate 48 in spiral relation to the plane of the film pack 45 to guide the innermost film convolution 43 spirally upwardly from the film pack 45. Circumferential lips 62 and 63 are, respectively, provided on the bottom of the lowermost roller 55 and uppermost rollers 51 and a circumferential lip 64 is provided on top of the middle roller 53. The lips 62–64 guide the film convolution 43 in its spiral movement. The remaining, intermediate rollers 52 and 54 are entirely cylindrical.

As above-indicated, the posts 56–60 supporting the film path rollers 51–55 are secured to the back plate 48 in canted fashion as illustrated by representative rollers 51 and 55 in FIGS. 12 and 13, respectively. The countersunk areas of the backplate 48 are formed with screw head-abutment surfaces 65 having planes offset from the plane of the backplate 48 at a predetermined angle 66. As a result, the film path rollers 51-55 have the same angular offset with respect to the film pack rollers 46. In place of defining a specific cant angle for the rollers 51-55, the rollers 51-55 may be flexible mounted on rigidly fixed upright posts (or the posts may be flexible mounted), permitting the natural spiral curvature of the film to move the rollers or posts to a canted dispositon.

The offset angle 66 is chosen so as to enable spiraling of the innermost film convolution 43 in its movement from the primary path of the film pack 45, along a secondary path defined by the film path rollers 51-55, to a secondary plane parallel and spaced from the primary plane, at which point the film convolution 43 exits the cassette, as in FIG. 1. The particular angle chosen depends on the specific size and rigidity of the film. Generally, for thin planar configurations of the present type, an angle between about 1° and about 10° is satisfactory to prevent warpage, creasing or cracking. For 16 mm film, an ideal angle is 3°30'.

Figure 8:
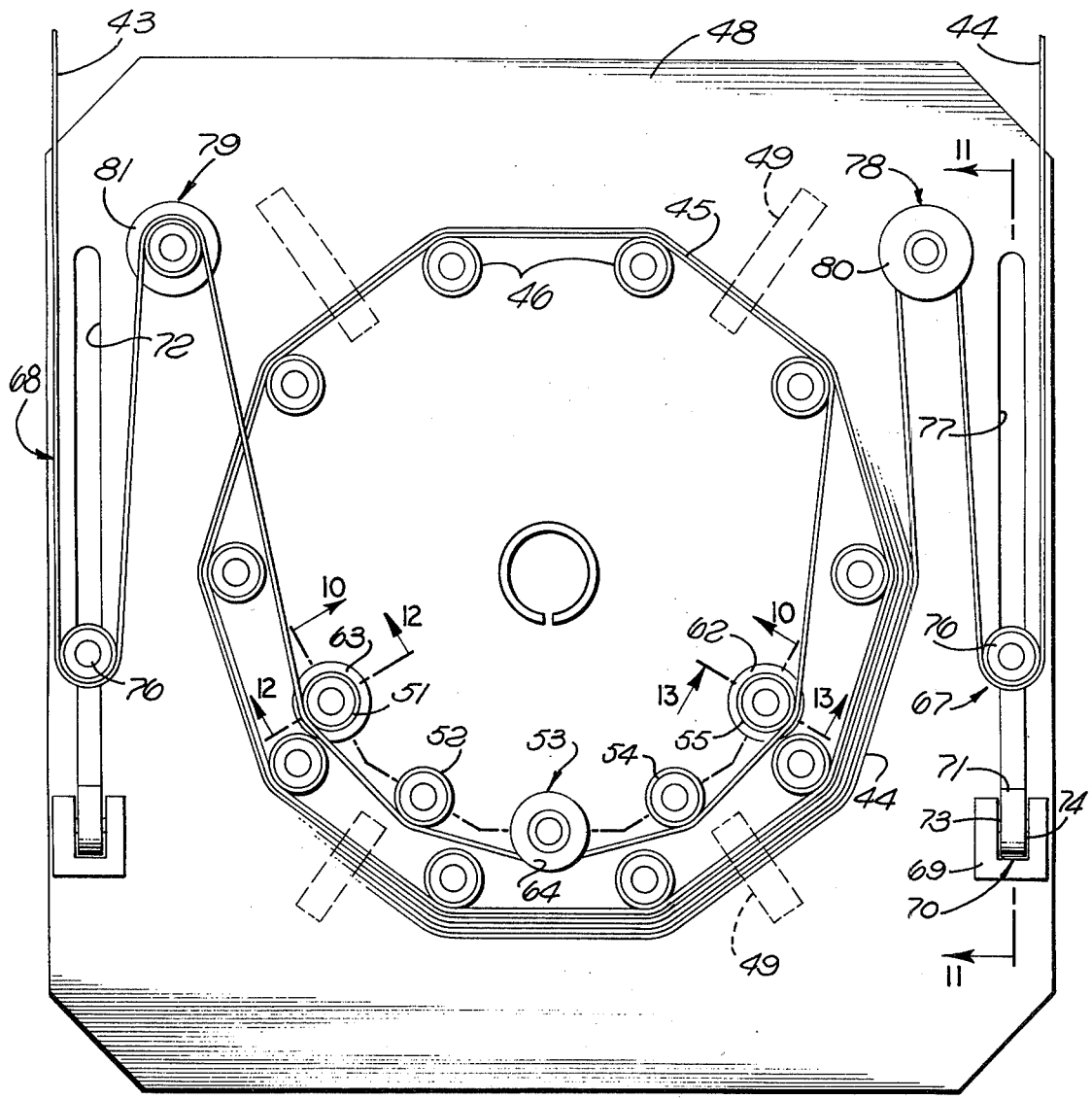
FIG. 8 is a cut-away plan view of the second embodiment cassette showing the path of the innermost convolution of film and the film pack.

Referring now to FIG. 11 and back to FIG. 8, differential take-up mechanisms 67 and 68 are secured to the back plate 48. The outgoing mechanism 67 is spaced further from the back plate 48 (in secondary plane) than is the incoming mechanism 68 but otherwise is identical to the incoming mechanism 68 and identical numerical designations will be used in their description. One of the mechanisms 67 is shown in more detail in FIG. 11 and includes a bracket 69 formed with an upright clevis 70 sandwiching a constant force spring 71, the center of which is secured to a bridging pin 72, connecting the opposing walls 73 and 74 of the clevis 70. The outer end of the coil 71 is secured to a roller post 75 supporting a tension roller 76. The tension roller post 75 is disposed in a close-fitting elongate slot 77 formed through the back plate 48 and is maintained upright by the downward-rearward pull of the coiled constant force spring 72 and abutment by the bottom surface of tension roller 76 against the top surface of the back plate adjacent the slot 77. The incoming, outer film convolution 44 is threaded in Z fashion around the tension roller 76 of the incoming mechanism and an incoming idler roller 78 spaced forwardly thereof. The outgoing, inner film convolution 43 is, similarly, threaded in Z fashion around the tension roller 76 of the outgoing mechanism 68 and an outgoing idler roller 79 spaced forwardly thereof. The incoming idler roller 78 carries a circumferential lip 80 on its top surface to direct the incoming film convolution 44 to the primary plane. The outgoing idler roller 79 carries a circumferential lip 81 on its bottom surface to direct the outgoing film convolution 43 to the secondary plane.

In operation, the inner and outer film convolutions 43 and 44 are threaded around the tension rollers 76 and idler rollers 79 and 78, respectively, to provide a loop portion external of the cassette 40, which as in the first embodiment is threaded through a projector or the like. Upon actuation of the projector, the Geneva or other pull down or transport mechanism of the projector pulls the innermost film convolution 43 from the cassette 40 while returning the outermost film convolution 44 thereto. Start-up differentials in tension are automatically adjusted by the differential take-up mechanisms 67 and 68 and an equilibrium disposition of the tension rollers 76 is soon reached. As the innermost film convolution 43 is withdrawn over the film path rollers 51-55 from the inner circumference of the film pack around the film pack rollers 46 which, simultaneously, causes the incoming, outermost film convolution 44 to wrap around the outer circumference of the film pack 45. As the inner film convolution 43 travels around the film path rollers 55-51 it is spiraled away from the primary plane of the film pack 45 by the progressively outwardly spaced circumferential lips 62 and 63 of the film path rollers 55 and 51, respectively, guided by the cylindrical film path rollers 54 and 52 and upper circumferential lip 64 of the middle film path roller 53. As the inner film convolution 43 reaches the outgoing differential mechanism 68 it is in the secondary plane and emerges from the cassette 40.

From a detailed consideration of this description it will be apparent to those skilled in the art that this invention may be employed in a number of different ways through the use of routine skill in this field. For this reason, the present invention is not to be considered as being limited except by the appended claims defining the invention.

What is claimed is:

1. In a cassette for an endless loop, wound pack of film, said film being planar with a width dimension at least 10 times its thickness dimension and a length dimension at least 100 times its width dimension, wherein the innermost convolution of film is withdrawn from the center of the film pack, which is rotating in a primary path, traversed through a secondary path, led to a first position outside said primary path, and then fed back to a second position outside said primary path, then onto the periphery of the film pack as the outermost convolution thereof; the improvement, comprising:

a plurality of film pack rollers fixed in position along said primary path and adapted to support at least a portion of the inner circumference of the film pack, said film pack rollers being disposed to approximate at least an arc of a circle having a first radius;

a plurality of film path rollers adapted to guide the innermost convolution of film from said film pack along said secondary path, said film path rollers being fixed in position to approximate at least an arc of a circle having a second radius less than said first radius and being disposed for spiral concentricity with said film pack rollers; and differential take-up means, for adjusting film tension, in the path of said film at at least one of said first and second positions.

2. In a cassette in accordance with claim 1, wherein the plane of said plurality of film path rollers in said spiral relation is offset from the plane of said plurality of film pack rollers by an angle between about 1° and about 10°.

3. In a cassette in accordance with claim 2, wherein said angle is about 3°6'.

4. In a cassette in accordance with claim 1, further comprising a back plate and posts for said film pack rollers secured to said back plate.

5. In a cassette in accordance with claim 4, further comprising a housing enclosing said film pack and film path rollers including a top wall spaced from said back plate and means secured to the inner surface of said top wall depending therefrom into contact with said film pack for retaining said film pack in juxtaposition to said back plate.

6. In a cassette in accordance with claim 1, wherein said film pack rollers are disposed to approximate a circular pattern and said film path rollers are disposed to approximate a semicircular pattern.

7. In a cassette in accordance with claim 6, further comprising a back plate and posts for said film pack and film path rollers secured to said back plate wherein at least two of said film path posts are secured to said back plate at an angle, in the direction of said spiral, of between 1° and 10° from perpendicular.

8. In a cassette in accordance with claim 7, wherein at least one of said film path posts is secured perpendicular to said back plate, the roller thereon having a length substantially in excess of the width of said film.

9. In a cassette in accordance with claim 7, further comprising a circumferential lip at the bottom edge of the rollers on one of said angled posts and a circumferential lip at the top edge of the rollers on another of said angled posts upstream along said secondary path.

10. In a cassette in accordance with claim 1 in which said differential take-up means are at both said first and second positions.

11. The method of removing a convolution of film from an endless loop wound film pack and returning it thereto, comprising the steps of:
supporting at least a portion of the inner circumference of said film pack at a first fixed radius;
withdrawing the innermost convolution of film from the center of the film pack;
engaging said innermost convolution of film with a plurality of rollers fixed to approximate an arc in spiral concentricity with said film pack;
guiding said innermost convolution of film from the plane of the film pack to a plane parallel and spaced therefrom past a first position outside said film pack and then past a second position outside said film pack back to the plane of the film pack, the film returning to the plane of the film pack forming the outermost convolution of the film pack; and
adjusting tension on said film at at least one of said first and second positions.

12. The method of claim 11 in which tension on said film is adjusted at both said first and second positions.

* * * * *